MAGNETIC SWITCHING DEVICE

Filed March 11, 1957 4 Sheets-Sheet 1

INVENTOR.
Stanford R. Ovshinsky
BY
Harness, Dickey & Pierce
ATTORNEYS.

INVENTOR.
Stanford R. Ovshinsky
BY
Harness, Dickey & Pierce
ATTORNEYS.

MAGNETIC SWITCHING DEVICE

Filed March 11, 1957 4 Sheets-Sheet 3

INVENTOR.
Stanford R. Ovshinsky
BY
Harness, Dickey + Pierce.
ATTORNEYS.

INVENTOR.
Stanford R. Ovshinsky
BY
Harness, Dickey + Pierce.
ATTORNEYS.

United States Patent Office 3,005,070
Patented Oct. 17, 1961

3,005,070

MAGNETIC SWITCHING DEVICE

Stanford R. Ovshinsky, Detroit, Mich., assignor to Tann Corporation, Detroit, Mich., a corporation of Michigan Filed Mar. 11, 1957, Ser. No. 645,259
22 Claims. (Cl. 200—87)

This invention relates to switching devices, and particularly to a switching device employing magnetizable particles for forming conducting paths which are intercepted to break the circuit for the current, and is a continuation-in-part of application Serial No. 573,724, filed March 26, 1956, now Patent No. 2,967,980 for Electrical Power Assist or Servo Mechanism and Control Means Therefor.

The device of the present invention employs precisely constructed magnetizable particles for making and breaking a circuit which in controlled by the device. While particles have been employed heretofore for conducting purposes in electric circuits, none have been constructed of precise particles and materials which produce the accurate orientation of chains of the particles for different positions of a magnetic field as it moves relative thereto. The particles are preferably of accurate spherical shape constructed from nickel/iron alloy of a ratio of 50% nickel and 50% iron or a variation thereof, or any other material chosen primarily for the low coercive force and residual properties inherent in the nickel/iron alloy. This produces the controlled formation of chains by a selected degree of magnetism which immediately demagnetizes upon the removal of the flux influence thereon so that the chains will break and interrupt the current paths.

A simple switch of the present device embodies a housing with a pivoted section therein having a cavity which may be cylindrical in shape or of semicylindrical shape from which two angular sides form an extending lip portion of decreasing width. A plurality of magnetizable balls are disposed in the cavity, those in the lip portion having greater resistivity than those in the cylindrical portion. Each side of the housing between which the sector is movable has a permanent magnet therein disposed in aligned relation with each other and the cavity. When the sector is moved from "off" to "on" position, the lip portion of the cavity approaches the magnets and as conducting chains are formed by the flux thereof a resistance against a surge of current in the circuit is set up until the cavity is directly between the magnets when the maximum number of chain paths are formed by the balls and a full flow of current takes place. The avoidance of the initial surge of current prevents destructive forces being applied to electric devices and particularly to the starting winding of motors on which such surges could have a destructive effect.

Accordingly, the main objects of the invention are: to provide a switching device through which current is conducted by a plurality of chains formed by magnetizable balls when acted upon by a magnetic field; to orient the balls in a switch in a predetermined manner so that as conducting chains are formed an initial surge of current is prevented as chains are progressively built up until a full flow of current passes through the circuit; to provide a switching device having magnetic means for forming chains of magnetizable balls having such resistivity that the balls will form a number of chains to control the amount of current which is passed through the device, and, in general, to provide a switching device which is simple in construction, positive in operation and economical of manufacture.

Other objects and features of novelty of the invention will be specifically pointed out or will become apparent when referring, for a better understanding of the invention, to the following description taken in conjunction with the accompanying drawings, wherein.

Figures 1, 2, 3, 4, 5:
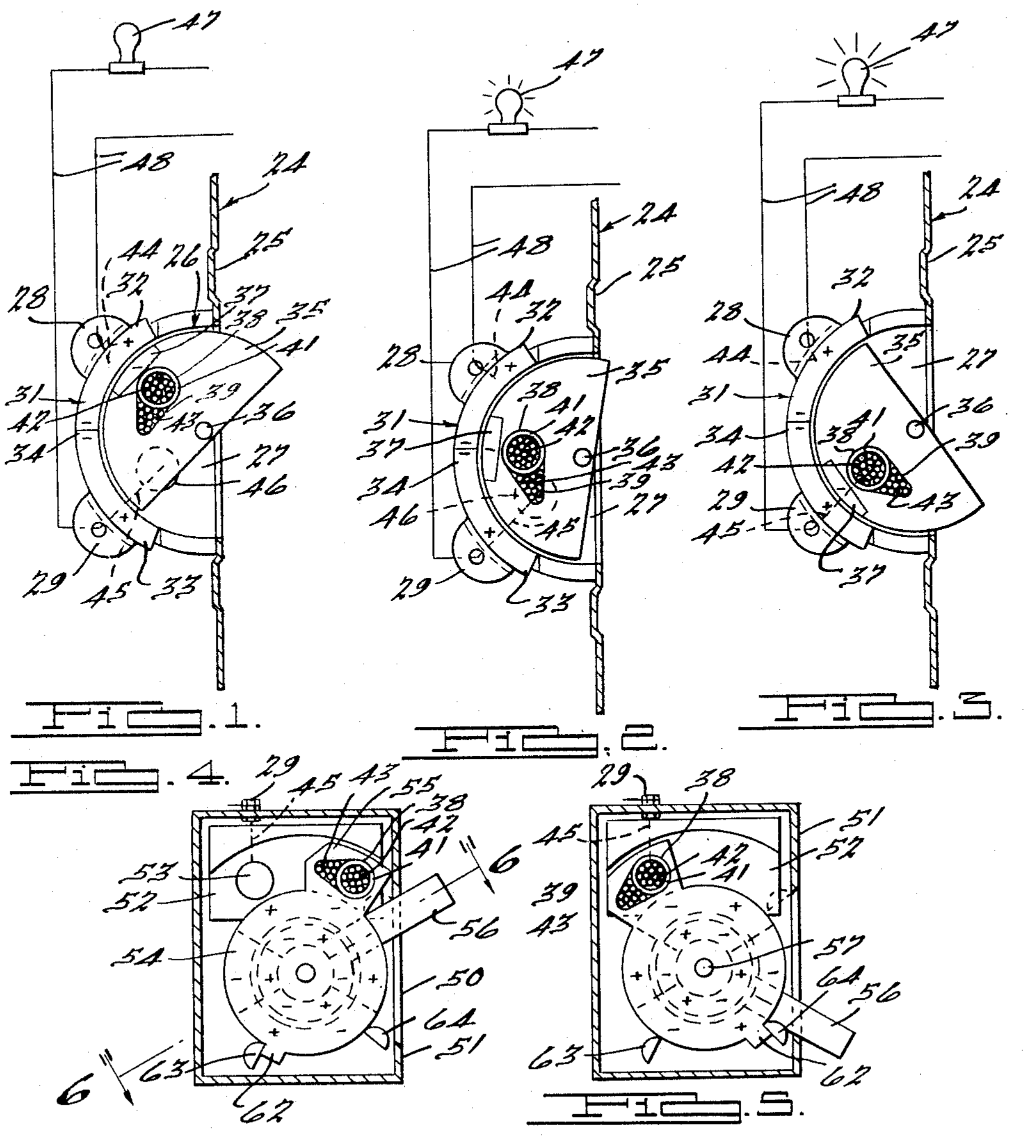
FIGURE 1 is a view in elevation of a switch embodying features of the present invention shown in "off" position and in combination with a circuit and load.
FIG. 2 is a view of the structure illustrated in FIG. 1, with the switch partially advanced toward "on" position sufficiently to produce some flow of current in the circuit.
FIG. 3 is a view of the structure illustrated in FIGS. 1 and 2, with the switch moved to full "on" position.
FIG. 4 is a sectional view of a switch, similar to that illustrated in FIGS. 1 to 3, showing a further form which the invention may assume with the switch in "off" position.
FIG. 5 is a view of the structure illustrated in FIG. 4, with the switch moved to "on" position.

Referring to FIGS. 1 to 3, inclusive, a switch 24 is illustrated, having a supporting plate 25 for a housing 26 which forms a semicylindrical cavity 27. A pair of terminals 28 and 29 are carried by and insulated from the housing 26. A pair of arcuate magnetic elements 31 are disposed about the housing 26 having the remote ends 32 and 33 of like polarity and the adjacent ends 34 of opposite but like polarity. A semicylindrical-shaped sector 35 is mounted within the cavity 27 on a pivot 36 to be moved from the "off" position, as illustrated in FIG. 1, to the "on" position as illustrated in FIG. 3. The element 35 has a magnet 37 disposed centrally of the arcuate peripheral edge thereof which is of opposite polarity to the polarity at the ends 32 and 33 of the magnetic elements 31 which produces an attractive force therebetween. The sector 35 has a cavity 38 of cylindrical shape terminating in a lip portion 39. The cavity 38 may be provided with a partition such as the cylindrical element 41 in which a plurality of balls 42 are provided and isolated from the balls 43 disposed within the lip portion 39 of the cavity, the latter being highly resistant to drain off the initial inrush of current. The opposite walls of the housing 26 support the magnets 46 between which the sector 35 is movable, so located as to be aligned with the cavity 38 thereof when the switching device is in "on" position. The cavity 38 is open at each end, permitting the ball to move into engagement with the magnets 46 when aligned therewith. Conductors 44 and 45 connect the magnets 46 to the terminals 28 and 29. It has been mentioned heretofore that the balls are precisely constructed from a material having low coercive properties and residual effects which have been treated in various manners, particularly by annealing, to release the strains and provide desirable properties. The magnets 46 herein illustrated are of the permanent type, and it is to be understood that a soft iron core could be substituted for one of the magnets to provide a flux path through the balls from the permanent magnet. In FIG. 1 it will be noted that the sector 35 is in the position in which the circuit is open, in which position the cavities 38 and 39 are spaced from the magnets 46 and no current can flow between the magnets.

In FIG. 2 the sector 35 has moved from the open position toward the closed position in a position which is unstable since the magnets 31 and 37 repel each other and the ends 32 and 33 attract the magnet 37. If the sector 35 were released in the position illustrated in FIG. 2, it would move back to open position since it has not quite advanced to or beyond the central position. When so advanced, the element 35 would be urged to "on" position through the attraction of the magnetic end 33 for the magnet 37. In the position illustrated in FIG. 2, the balls 43 in the lip portion 39 of the cavity have moved between the magnets 46 and have thereby produced conducting chains of the balls 43 which causes some flow of current in a circuit 48 which is connected to the terminals 28 and 29. A lamp 47 provided in the circuit is illustrated in FIG. 2 as being partially illuminated to show only a small current flow which eliminates an initial surge of the current.

In FIG. 3 the sector 35 has moved to completely "on" position where the balls 42 within the cavity 38 are influenced by the magnets 46 to form a maximum number of chains and pass a maximum amount of current through the circuit 48, to thereby fully supply the load 47 which is indicated in FIG. 3 by the fully illuminated lamp 47. The balls may be coated with a conducting material, such as silver, copper and the like to freely pass current without resistance, or the balls could be left uncoated so that they may control the amount of current which will be passed by each chain, and through the control of the number of chains to be formed, the amount of current passed may thereby be regulated. By reversing the movement of the sector 35, the chains are broken as the balls move beyond the magnets 46 and the flow of current through the circuit 48 is interrupted. The circuit is made and broken and the movable sector 35 retained in either "on" or "off" position by the attractive force between the magnets 31 and 37, the sector being unstable when in a position therebetween due to the repellent force between the magnets.

Figure 6:
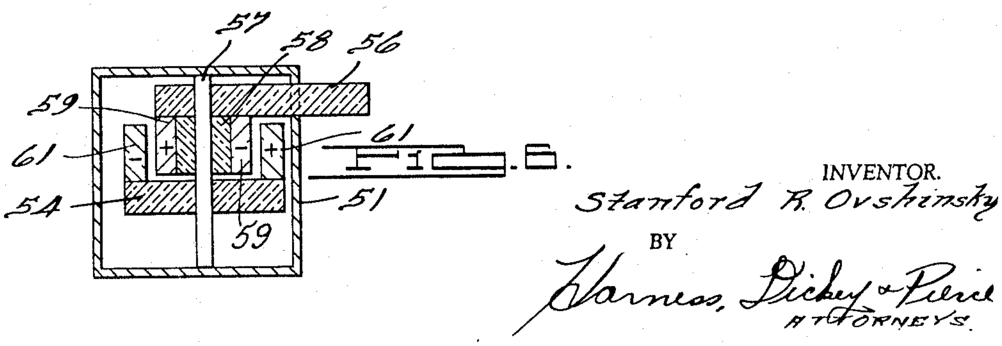
FIG. 6 is a sectional view of the structure illustrated in FIG. 4, taken on the line 6—6 thereof.

In FIGS. 4, 5 and 6, another form of switch is illustrated, that wherein a housing 51 has an element 52 mounted therein provided with spaced magnets 53. A cylindrical element 54 has an extending sector portion 55 containing cavities 38 and 39 provided with balls 42 and 43, which sector is movable between the magnets 53 to have the cavities aligned therewith. An operating finger 56 extends from a slot 50 in the housing 51 and is pivoted on a shaft 57 supporting an element 58 on which three magnets 59 are mounted. The cylindrical element 54 has three magnets 61 mounted thereon so related to the magnets 59 as to control the position of the cylindrical element 54 by the movement of the handle 56. When the handle is in the position illustrated in FIG. 4, the magnets 59 are in the position to have the element 54 move clockwise to align the plus and minus ends of the opposite magnets, as illustrated in the figure. In this position, the cylindrical element 54 is limited in its clockwise movement by a projecting finger 62 which abuts a stop 63. When the handle 56 is moved clockwise downwardly, the magnets 59 are so shifted as to cause the magnets 61 to move the cylindrical element 54 in a counterclockwise direction limited by the striking of the finger 62 against a stop element 64. In this position the balls 22 of the cavity 38 are aligned with the magnets 53 to form chains which pass current through the magnets and the conductors 44 and 45 connected thereto and to a circuit to be controlled.

Figure 7:
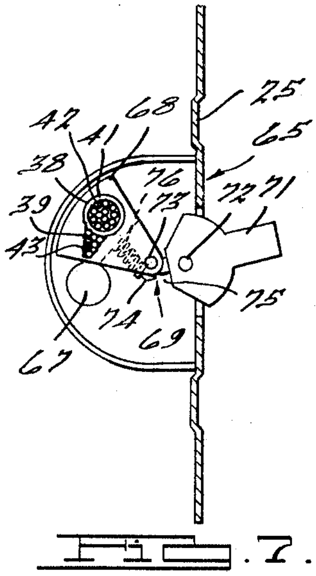
FIG. 7 is a view of structure, similar to that illustrated in FIG. 1, showing a different operating mechanism for the switch, with the switch in "off" position.
Figure 8:
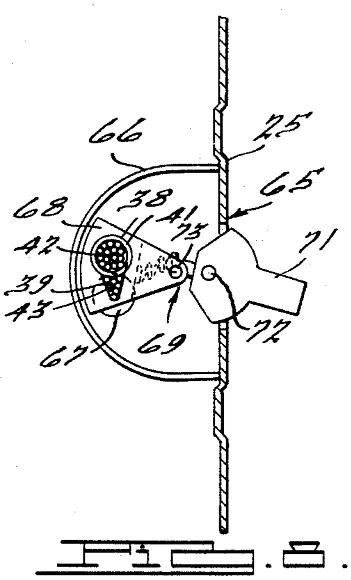
FIG. 8 is a view of the structure illustrated in FIG. 7, with the switch advanced toward "on" position.
Figure 9:
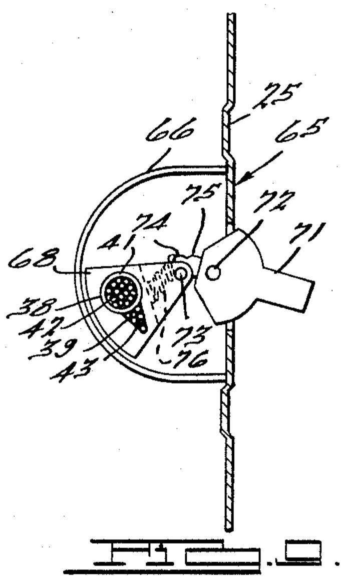
FIG. 9 is a view of the switch illustrated in FIGS. 7 and 8, shown in full "on" position.

In FIGS. 7, 8 and 9, a switch 65 is illustrated similar to the switch 24 of FIGS. 1, 2 and 3, having a mounting plate 25, a housing 66 secured thereto containing a pair of magnets 67 between which a sector 68 is movable. The sector has cavities 38 and 39 therethrough containing the balls 42 and 43 which are moved between the magnets 67 and contacted thereby when formed into chains therebetween. The chains pass current in an increasing amount to restrict the initial flow through the lip portion of the cavity, to thereby prevent a surge occurring in the connected circuit. A toggle mechanism 69 is employed for shifting the sector 68, the mechanism embodying an actuating element 71 pivoted to the casing 66 on a pintle 72. The sector 68 is pivoted to the case forwardly of the pintle 72 on the pins 73. An end 74 on a forwardly projecting finger 75 engages a spring 76 which is compressed when the element 71 is moved toward center position. The engaged end of the spring is shifted to the right or left of the center line between the pivots 72 and 74 and produces a snap action of the sector 68 from the position illustrated in FIG. 7 to the position illustrated in FIG. 9. Assurance is always had that when the contact is made between the circuit through the pair of magnets 67 and the balls 42 and 43, a flow of current will occur, or upon the opposite movement of the actuating element 71 the sector 68 will return to the position illustrated in FIG. 7 and completely interrupt the circuit.

Figures 10, 11:
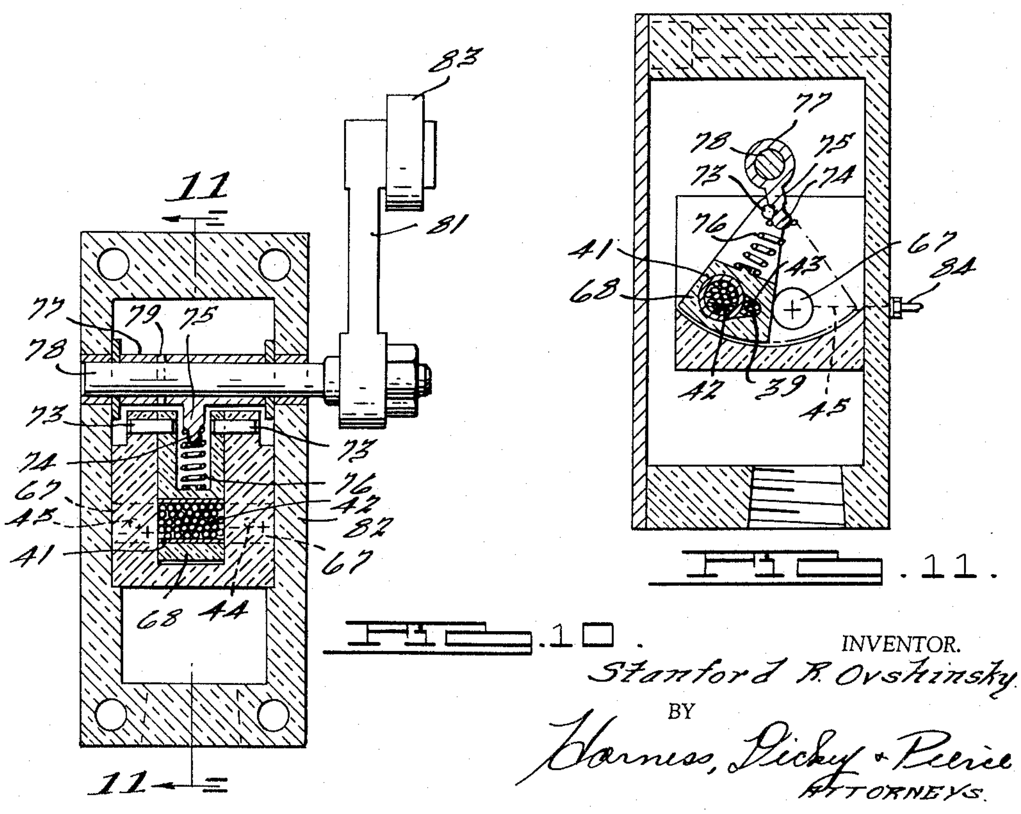
FIG. 10 is a sectional view of a switch, similar to that illustrated in FIGS. 7, 8 and 9, but disclosing a different operating arm therefor.
FIG. 11 is a sectional view of the structure illustrated in FIG. 10, taken on the line 11—11 thereof.

In FIGS. 10 and 11 a similar form of device in the nature of a limit switch is illustrated, that wherein the sector 68 is swingable between a pair of magnets 67 on the pins 73, with the extending end 74 of the finger 75 engaging the spring 76. The finger 75 is secured to a sleeve 77 which is fixed to a shaft 78 by a pin 79 as illustrated in the figures. An arm 81 is attached to the shaft 78 exteriorly of an enclosing housing 82 and has a roller 83 thereon which is engaged by a movable element to shift the sector 68 and therefore control the making and breaking of a circuit. The magnets 67, as illustrated in FIG. 10, have terminals 84 attached thereto which are connected in a circuit which is completed when the balls 42 and 43 engage the magnets and are formed into chains thereby. The making and breaking of the circuit occurs with a snap action produced by the spring 76 when moved to over-toggle position.

Figure 12:
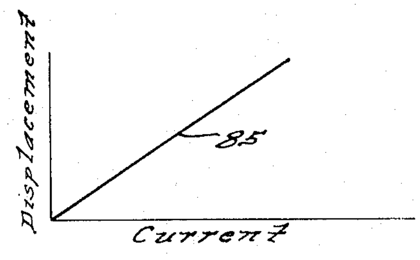
FIG. 12 is a view of a diagram showing the linear relation between the displacement and current.
Figure 13:
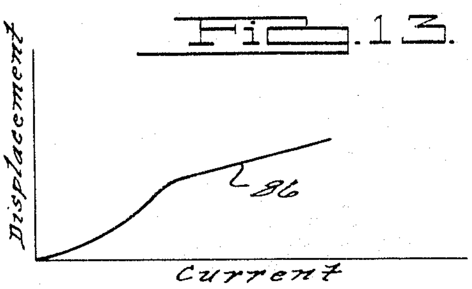
FIG. 13 is a view of a diagram showing how the relationship in the diagram of FIG. 12 may be varied.

In the curve of FIG. 12 the line 85 indicates a linear relationship between the displacement of the magnetic means 46 relative to the magnetic particles 42 and 43 and the amount of current which passes through the particles. The relationship between displacement and current flow is linear, as shown from the straight line in the curve. In FIG. 13 the line 86 is nonlinear and may be varied to meet any desired condition by various means hereinafter to be described.

Figure 14:
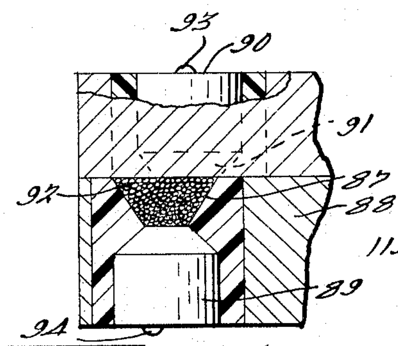
FIG. 14 is a sectional view of structure, similar to that illustrated in FIG. 6, showing another arrangement of the invention.
Figure 17:
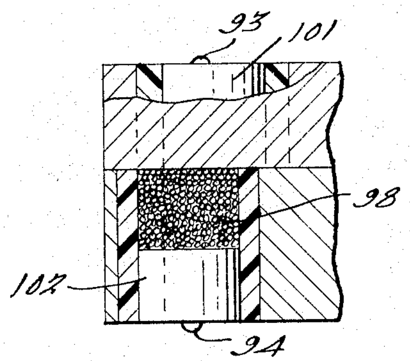
FIG. 17 is a sectional view of structure, similar to that illustrated in FIG. 14, showing a further form of the invention.
Figure 18:
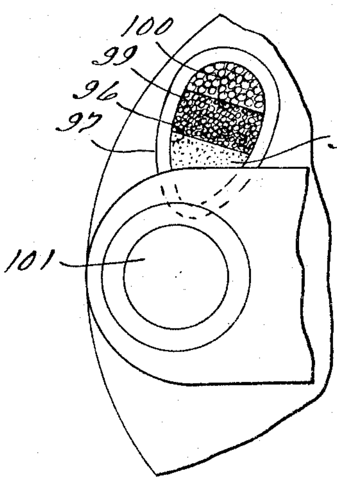
FIG. 18 is a plan view of the structure illustrated in FIG. 17.

In FIG. 14 the cavity 87 in the plate 88 is of truncated conical shape and the magnet 89 has a corresponding truncated conical shape at the upper end to mate with the area at the bottom of the cavity. Similarly, the shiftable magnet 90 has a lower face 91 which is of truncated conical shape, the shape being such that the various positions of the face 91 relative to the cavity 87 will produce a different effect on the magnetic particles 92 to vary the rate of flow of current through the conductors 93 and 94 so that the curved line 86 illustrated in FIG. 13 would result. A similar relationship obtains for the structure illustrated in FIGS. 17 and 18, wherein a cavity 96 has a converging end 97 with magnetic particles 98 of small mass in the converging end, with larger particles 99 at the central portion and still larger particles 100 at the end opposite to the converging end. The different graded particles are separated from each other by partitions in the same manner as the dissimilar balls 42 and 43 illustrated in FIGS. 1 to 5. As the magnet 101 passes over the cavity, the magnetic particles will be aligned in certain flux patterns to form conducting chains between the magnets 101 and 102. The number of flux patterns will vary due to the converging shape of the end 97 and the different size of the particles 98, 99 and 100. As a result, by varying the shape of the cavity and by varying the magnetic particles in size and material employed and segregating them in different areas or intermingling them throughout the entire area of the cavity, variations in the curve 99 will be obtained to meet any required pattern.

Figure 19:
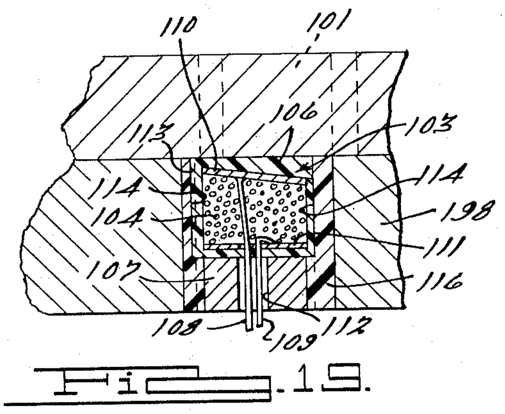
FIG. 19 is a view of structure, similar to that illustrated in FIG. 14, showing still another form of the invention.

In FIG. 19 a further arrangement is illustrated for varying the curve 86. In this relationship, the cavity in the plate 198 has a removable thin wall capsule 103 therein containing magnetizable particles 104, with the top wall 106 of the capsule sloping, stepped or otherwise varied in thickness across its face to change the gap between the magnets 101 and 107. Conductors 108 and 109, joined to conducting plates 110 and 111, pass through an aperture 112 in the magnet 107. A fin 113 may be provided on one side of the capsule, fitting into a slot 114 in the wall of the aperture or the insulating sleeve 116, in case the plate is conducting, so as to maintain the capsule against rotation. The change in the flux pattern which will be produced by the variation in the air gap will change the curve 86 to vary it from the linear curve 85 of FIG. 12. A series of capsules may be furnished with each device, some having uniform wall thickness, some containing magnetic particles 104 of different size and material, while others may segregate certain of the particles, thereby obtaining different relationships between displacements and current in the same device.

Figure 15:
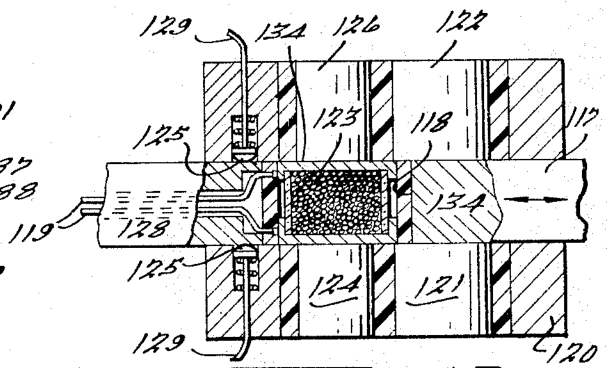
FIG. 15 is a sectional view of structure, similar to that illustrated in FIG. 14, showing another form of the invention.

Referring to FIG. 15, a further form of the invention is illustrated, that wherein a plate 117 contains a cavity 118 having a pair of conductors 119 extending therefrom. The plate 117 is movable in a slot in a plate 120 between sets of magnets 121 and 122 and 124 and 126. In this arrangement, the magnetic particles in the capsule 123 are movable between the magnets 121 and 122 which will produce the same result as if the magnets were moved over the magnetic particles. The magnet 126 of the additional sets of magnets 124 and 126 has the poles reversed so that instead of an attractive force a repellent force will result between the pole faces of the two magnets which quickly repels the particles in the capsule 123 and breaks up the conducting chains to thereby quickly interrupt the current passing through the conductors 119. Further movement of the plate 117 moves the conducting caps 134 of the capsule 123 into engagement with spring-pressed contacts 125 so that each one of the conductors 119 may complete a circuit with a conductor 129 connected to the contacts 128. With this arrangement, other servo mechanism may be directly connected into either branch of the circuit 119. If a conducting band is employed in place of the spring-pressed contacts 125, or the conductors 129 are joined, a shunt will be provided across the circuit 119. Due to hysteresis, the demagnetization of the particles is retarded, and by the use of the set of magnets 124 and 126 the repelling of the particles immediately breaks up the conductive chains and interrupts the current flow.

Figure 16:
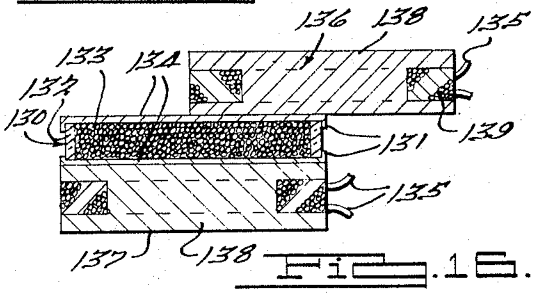
FIG. 16 is a sectional view of structure, similar to that illustrated in FIG. 14, showing still another form which the invention may assume.

In FIG. 16, a further arrangement is illustrated, wherein capsules are provided as a series of units having magnetic particles of different size, material and orientation so that a control device may be constructed by selecting a capsule of known characteristics to provide a desired flow of current through the conductors 131. A nonconductive magnetic ring 132 contains magnetizable particles 133 enclosed by upper and lower conductive caps 134 to which the conductors 131 are joined. A pair of magnetic elements 136 and 137 are mounted on opposite sides of the capsule. Either or both of the magnetic elements may be movable relative to the capsule to control the application of the magnetic force through the particles 133. In the figure, the magnetic element 137 is illustrated in fixed relation to the capsule while the magnetic element 136 is shown as being movable relative thereto. The magnetic elements may comprise a pole piece or body 138 containing a coil 139 energized from a suitable source through a pair of leads 135 containing a coil 139 energized from a suitable source through a pair of leads 135 extending from the coil. One or both of the pole pieces may be permanent magnets or of magnetizable material, in which latter case one or both of the coils 139 may be employed therewith. It is also to be understood that the pole pieces 138 may be spaced farther apart and not contact the conducting caps 134 if it is desirable that no wear occur between the elements. When the upper grid is movable, as illustrated, its approach to the fixed grid 138 and capsule will cause conducting chains to be formed of the magnetizable particles 133 and indicate the approach of the pole piece 138. The continued approach of the pole piece produces more and more chains and more and more current is passed through the capsule and circuit connected thereto. The nonconducting magnetic ring 132 maintains the particles spaced and oriented relative to each other so that the conducting paths are repeated to pass the same current as the magnetic element 136 is moved into the same positions. A coating of silver or the like may be applied to the particles, which is plated or otherwise applied thereto to improve the conductivity through the particles.

Figure 22:
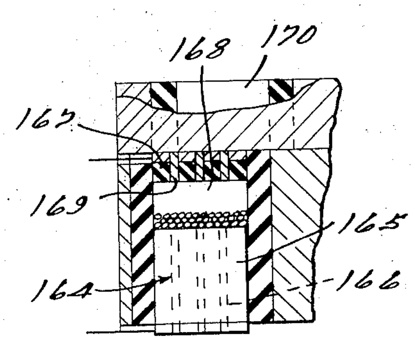
FIG. 22 is a sectional view of a grid, similar to those illustrated in the foregoing figures, showing a further form which the invention may assume.

When nonmagnetic capsules are filled with the magnetizable particles, the particles are not maintained in oriented relation for reproducing a like number of chains for like energization. In the present instance, the nonconducting ring 132 is made of a ceramic material which is magnetic so as to establish lines of flux between the upper end thereof and the magnetic element 137 when the magnetic element 136 is moved out of position so as to maintain the particles oriented at all times in position to form the same group of conducting chains repeatedly when subjected to the same degree of magnetism. Without the magnetic field provided by the magnetic ring 132, after the conducting chains are formed by aligning the magnetic element 136 with the magnetic element 137 and the magnetic element 136 is moved away to the right as viewed in FIG. 16, the chains of particles are more likely to shift over to the right in the direction in which the magnetic element 136 is moving away and thus unevenly distribute the particles. By providing the magnetic ring 132, it has been found that the additional lines of flux thus created reduce the shifting of the magnetizable particles in this manner and thus tend to keep the particles evenly distributed or oriented within the ring. Another method of orienting the chains made from the balls is disclosed in FIG. 22, that wherein a grid 164 has a nonconducting body 165 and magnetic rods 166 disposed therethrough. A section of a grid 167 is disclosed above the cavity 168 having magnetizable rods 169 therethrough. Such bodies may be made of plastic, ceramic, stainless steel and like materials. The magnetic rods 166 have the same polarity across the cavity as the rods 169 and the balls are repelled. The end of the magnet 170 is of like polarity to the adjacent end of the rods 169, so that when the magnet 170 is moved above the grid 167, the polarity of the rods 169 is reversed and a line of contacting balls, hereinafter referred to as chains will be formed between the ends of the aligned rods 169 and the rods 166, the rods being of the opposite polarity. When the magnet 170 is moved away from the grid 167, the magnetic rods 166 will attract the balls to the bottom of the cavity 168 and the magnetic rods 169 will repel the balls. Thus, with the presence of a like amount of flux, a like number of joined rows of balls or chains will be formed and a like amount of current will be passed across the cavity 168, depending upon the resistance of the chain or chains. The resistivity of the material of the balls will control the passage of the current, a coating of a resistance material applied to the surface of the balls will restrict the current passage, while a coating of silver or a like conducting material will permit a large amount of current to pass through the chains. A gelatinlike substance could also be employed to retain the particles oriented while permitting the conducting chains to be produced.

Figure 20:
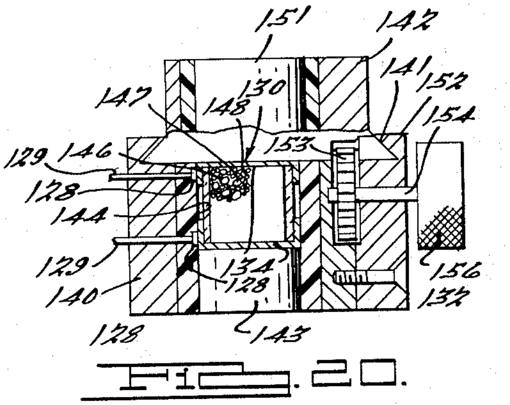
FIG. 20 is a sectional view of structure, similar to that illustrated in FIG. 14, showing another form which the invention may assume.
Figure 21:
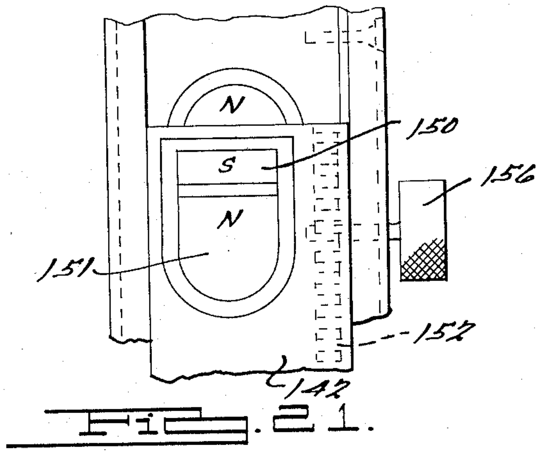
FIG. 21 is a plan view of the structure illustrated in FIG. 20.

In FIGS. 20 and 21 a further form of the invention is illustrated, that wherein a base member 140 has ways 141 on which a slide 142 is longitudinally movable. The base member 140 supports a magnet 143 in the lower portion of a cavity 144 beneath a capsule 130 containing oriented particles 146. These particles are selected for size, the large particles 147 substantially filling the cavity, with the small particles 148 in the voids about the particles 147. The small particles orient themselves as satellites about the larger particles 147 and all of the particles are enclosed within the capsule 130, the conducting caps 134 of which are connected to contacts 128 of conductors 129 when the capsule is placed within the cavity 144. A magnet 150 is mounted in the slide 142 forwardly of a magnet 151. The magnet 150 has its pole faces reversed from the magnets 151 and 143 so as to repel the particles after they have been joined into chains by the magnet 151, thereby aiding in breaking up the chains. A rack 152 is mounted on the bottom face of the slide 142 and has the teeth thereof engaged with the teeth of a pinion 153 which is mounted on the member 140 and on a shaft 154 which has an operating knob 156 on the outer end. Through the rotation of the knob 156, the member 142 is moved longitudinally to position the magnets 150 and 151 relative to the particles 147 and 148 in the capsule 130.

It is further to be understood that permanent and coil types of magnets are herein illustrated and that one may be substituted for the other and that the recitation of magnetic means in the claims applies to either type of magnet or to both types since they are interchangeable.

What is claimed is:

1. In a switch device, relatively movable plates one of which contains a cavity, magnetizable particles in said cavity, conducting means completing a circuit to said particles, and magnetic means associated with said plates on both sides of said cavity and movable between a first and second position, said magnetic means being aligned with said cavity on opposite sides thereof when in said first position to move the magnetizable particles into conducting relationship and complete a circuit through said particles, said magnetic means being moved out of alignment with said cavity when in said second position to move the particles out of conducting relationship to interrupt said circuit.

2. In a switch device, relatively movable plates one of which contains a cavity, magnetizable particles in said cavity, conducting means completing a circuit to said particles, and magnetic means associated with said plates on both sides of said cavity and movable between a first and second position, said magnetic means being aligned with said cavity on opposite sides thereof when in said first position to move the magnetizable particles into conducting relationship and complete a circuit through said particles, said magnetic means being moved out of alignment with said cavity when in said second position to move the particles out of conducting relationship to interrupt said circuit, and means resisting the relative movement of said plates.

3. In a switch device, relatively movable plates one of which contains a cavity, magnetizable particles in said cavity, conducting means completing a circuit to said particles, and magnetic means associated with said plates on both sides of said cavity and movable between a first and second position, said magnetic means being aligned with said cavity on opposite sides thereof when in said first position to move the magnetizable particles into conducting relationship and complete a circuit through said particles, said magnetic means being moved out of alignment with said cavity when in said second position to move the particles out of conducting relationship to interrupt said circuit, said cavity being of such shape that the amount of movement is in direct proportion to the amount of current conducted by said circuit.

4. In a switch device, relatively movable plates one of which contains a cavity, magnetizable particles in said cavity, conducting means completing a circuit to said particles, and magnetic means associated with said plates on both sides of said cavity and movable between a first and second position, said magnetic means being aligned with said cavity on opposite sides thereof when in said first position to move the magnetizable particles into conducting relationship and complete a circuit through said particles, said magnetic means being moved out of alignment with said cavity when in said second position to move the particles out of conducting relationship to interrupt said circuit, said cavity varying in width from the point of initial engagement by the magnetic means for varying the relationship between the amount of movement of the magnetic means and the amount of current conducted by the circuit.

5. In a switch device, relatively movable plates one of which contains a cavity, magnetizable particles in said cavity, conducting means completing a circuit to said particles, and magnetic means associated with said plates on both sides of said cavity and movable between a first and second position, said magnetic means being aligned with said cavity on opposite sides thereof when in said first position to move the magnetizable particles into conducting relationship and complete a circuit through said particles, said magnetic means being moved out of alignment with said cavity when in said second position to move the particles out of conducting relationship to interrupt said circuit, some of said magnetizable particles being of different material from other of said particles.

6. In a switch device, relatively movable plates one of which contains a cavity, magnetizable particles in said cavity, conducting means completing a circuit to said particles, and magnetic means associated with said plates on both sides of said cavity and movable between a first and second position, said magnetic means being aligned with said cavity on opposite sides thereof when in said first position to move the magnetizable particles into conducting relationship and complete a circuit through said particles, said magnetic means being moved out of alignment with said cavity when in said second position to move the particles out of conducting relationship to interrupt said circuit, and means for orienting the particles within the cavity relative to each other.

7. In a switch device, relatively movable plates one of which contains a cavity, magnetizable particles in said cavity, conducting means completing a circuit to said particles, and magnetic means associated with said plates on both sides of said cavity and movable between a first and second position, said magnetic means being aligned with said cavity on opposite sides thereof when in said first position to move the magnetizable particles into conducting relationship and complete a circuit through said particles, said magnetic means being moved out of alignment with said cavity when in said second position to move the particles out of conducting relationship to interrupt said circuit, said particles being spaced different amounts below the top of the cavity.

8. In a switch device, relatively movable plates one of which contains a cavity, magnetizable particles in said cavity, conducting means completing a circuit to said particles, and magnetic means associated with said plates on both sides of said cavity and movable between a first and second position, said magnetic means being aligned with said cavity on opposite sides thereof when in said first position to move the magnetizable particles into conducting relationship and complete a circuit through said particles, said magnetic means being moved out of alignment with said cavity when in said second position to move the particles out of conducting relationship to interrupt said circuit, and demagnetizing means adjacent to said magnetic means for interrupting the conducting paths when moved into a position to affect said particles.

9. In a switch device, relatively movable plates one of which contains a cavity, magnetizable particles in said cavity, conducting means completing a circuit to said particles, and magnetic means associated with said plates on both sides of said cavity and movable between a first and second position, said magnetic means being aligned with said cavity on opposite sides thereof when in said first position to move the magnetizable particles into conducting relationship and complete a circuit through said particles, said magnetic means being moved out of alignment with said cavity when in said second position to move the particles out of conducting relationship to interrupt said circuit, and a second circuit completed to a portion of said first circuit when said plates are moved to said second position.

10. In a switch device, relatively movable plates one of which contains a cavity, magnetizable particles in said cavity, conducting means completing a circuit to said particles, and magnetic means associated with said plates on both sides of said cavity and movable between a first and second position, said magnetic means being aligned with said cavity on opposite sides thereof when in said first position to move the magnetizable particles into conducting relationship and complete a circuit through said particles, said magnetic means being moved out of alignment with said cavity when in said second position to move the particles out of conducting relationship to interrupt said circuit, and means shunting said circuit from said particles when said plates are moved to said second position.

11. In a switch device, relatively movable plates one of which contains a cavity, magnetizable particles in said cavity, conducting means completing a circuit to said particles, and magnetic means associated with said plates on both sides of said cavity and movable between a first and second position, said magnetic means being aligned with said cavity on opposite sides thereof when in said first position to move the magnetizable particles into conducting relationship and complete a circuit through said particles, said magnetic means being moved out of alignment with said cavity when in said second position to move the particles out of conducting relationship to interrupt said circuit, said magnetic means comprising a pair of pole pieces adapted to be positioned on opposite sides of said cavity, and a coil for magnetizing each of said pole pieces in proportion to the energization of the coil whereby the energization of the coils causes the pole pieces to form conducting paths through said magnetizable particles to pass current in an amount which varies with the pole piece magnetization.

12. In a switch device, relatively movable plates one of which contains a cavity, a capsule removably supported in said cavity, said capsule being made of non-conducting material and having spaced apart bottom and top walls, spaced apart conducting plates within said cavity adjacent to the inner surfaces of said bottom and top walls, conducting means completing a circuit to said conducting plates, magnetizable particles disposed within said cavity, and magnetic means associated with said plates on both sides of said capsule and movable between a first and second position, said magnetic means being aligned with said capsule on opposite sides thereof when in said first position to move the magnetic particles within the capsule into conducting relationship with said conducting plates to complete a circuit through said particles, said magnetic means being moved out of alignment with said capsule when in said second position to move the particles out of conducting relationship with said conducting plates to interrupt said circuit.

13. The invention as defined in claim 12 wherein said top wall of the capsule varies in thickness to vary the spacing between the conducting plate on the inner surface thereof and the magnetic means thereabove.

14. In a switch device, relatively movable elements one of which contains a cavity, a first magnetic means at the bottom of said cavity, magnetizable particles in said cavity above said first magnetic means, a conductor carried by said second element completing a circuit to said particles when said other element is moved to said first position wherein said magnetic means are aligned with the cavity on both sides thereof to move the particles into conducting relationship to interrupt said circuit when said other element is moved to said second position.

15. In a switch device, a housing, magnets in opposite walls of the housing, a movable nonconducting element in said housing between said magnets, said element having a cavity therethrough aligned with said magnets in one position of the element, magnetizable balls in said cavity, and means by which said element is moved to advance the cavity into and from alignment with said magnets.

16. In a switch device, a housing, magnets in opposite walls of the housing, a movable nonconducting element in said housing between said magnets, said element having a cavity therethrough aligned with said magnets in one position of the element, magnetizable balls in said cavity, and conductors on said magnets through which current can flow when the magnets and cavity are aligned and the balls engage the magnets and each other.

17. In a switch device, a housing, magnets in opposite walls of the housing, a movable nonconducting element in said housing between said magnets, said element having a cavity therethrough aligned with said magnets in one position of the element, magnetizable balls in said cavity, and terminals to which a circuit is connectable conductively joined to said magnets.

18. In a switch device, a housing, magnets in opposite walls of the housing, a movable nonconducting element in said housing between said magnets, said element having a cavity therethrough aligned with said magnets in one position of the element, magnetizable balls in said cavity, terminals to which a circuit is connectable conductively joined to said magnets, and magnetic means urging said sector to "on" and "off" positions.

19. In a switch device, a housing, magnets in opposite walls of the housing, a movable nonconducting element in said housing between said magnets, said element having a cavity therethrough aligned with said magnets in one position of the element, magnetizable balls in said cavity, terminals to which a circuit is connectable conductively joined to said magnets, and spring means associated with said movable means to shift said sector to "on" and "off" positions with a snap action.

20. In a switch device, a housing, magnets in opposite walls of the housing, a movable nonconducting element in said housing between said magnets, said element having a cavity therethrough aligned with said magnets in one position of the element, magnetizable balls in said cavity, and means by which said element is moved to advance the cavity into and from alignment with said magnets, said balls being made of a material resisting the passage of current to prevent a surge thereof occurring upon initially forming the chains.

21. In a switch device, a housing, magnets in opposite walls of the housing, a movable nonconducting element in said housing between said magnets, said element having a cavity therethrough aligned with said magnets in one position of the element, magnetizable balls in said cavity, and means by which said element is moved to advance the cavity into and from alignment with said magnets, the cavity being narrow at the point which first passes over the magnets to have a minimum number of chains initially formed which provide substantial resistance to the initial passage of current to prevent a surge of current in the circuit.

22. In a switch device, a housing, magnets in opposite walls of the housing, a movable nonconducting element in said housing between said magnets, said element having a cavity therethrough aligned with said magnets in one position of the element, magnetizable balls in said cavity, and means by which said element is moved to advance the cavity into and from alignment with said magnets, the cavity being narrow at the point which first passes over the magnets to have a minimum number of chains initially formed which provide substantial resistance to the initial passage of current to prevent a surge of current in the circuit, said balls being made of material offering high resistance to the flow of current.

References Cited in the file of this patent

UNITED STATES PATENTS

| | | |
|---|---|---|
| 680,704 | Dion | Aug. 20, 1901 |
| 781,993 | Bell | Feb. 7, 1905 |
| 1,225,507 | Sedgwick | May 8, 1917 |
| 1,348,842 | Barlow | Aug. 10, 1920 |
| 1,868,559 | Bascom | July 26, 1932 |
| 2,015,156 | Richmond | Sept. 24, 1935 |
| 2,203,321 | Bascom | June 4, 1940 |
| 2,520,935 | Hubbell | Sept. 5, 1950 |
| 2,548,581 | Bigelow | Apr. 10, 1951 |
| 2,660,640 | Wolf | Nov. 24, 1953 |
| 2,668,884 | Jacobs | Feb. 9, 1954 |
| 2,687,500 | Jones | Aug. 24, 1954 |
| 2,715,166 | Fitch | Aug. 9, 1955 |
| 2,770,697 | Kellett | Nov. 13, 1956 |